United States Patent [19]
De Priester et al.

[11] 3,722,613
[45] Mar. 27, 1973

[54] POWER DRIVEN MATERIAL HANDLING TRUCK

[75] Inventors: Donald Jack De Priester; David C. Horney, both of Muscatine; Robert H. Mangels, Buffalo, all of Iowa

[73] Assignee: Hon Industries Inc., Muscatine, Iowa

[22] Filed: Dec. 21, 1970

[21] Appl. No.: 100,191

[52] U.S. Cl. ................................180/52, 280/96
[51] Int. Cl. ..........................................B60k 17/30
[58] Field of Search......180/52, 13; 280/93, 95 R, 96

[56] References Cited

UNITED STATES PATENTS

| | | | |
|---|---|---|---|
| 3,031,024 | 4/1962 | Ulinski | 180/52 X |
| 2,713,918 | 7/1955 | Framhein | 180/52 |
| 2,925,887 | 2/1960 | Gibson | 180/52 X |
| 3,392,797 | 7/1968 | Gibson | 180/52 |

Primary Examiner—Gerald M. Forlenza
Assistant Examiner—George F. Abraham
Attorney—Pendleton, Neuman, Williams & Anderson

[57] ABSTRACT

Disclosed herein is a material handling truck of the stand-up rider type having four support wheel units, including two steerable support wheel units, one of which comprises a power driven traction wheel. The two steerable wheel units are mounted on a rigid subframe joined to the main frame of the truck for pivotal movement about a longitudinal axis so that the wheels can accommodate to uneven terrain and thereby maintain the traction wheel in effective contact with varying subjacent surfaces. The second steerable wheel unit comprises a pair of spaced wheels which have independent horizontal tilting movement about a mounting axis spaced below the axis of rotation of these wheels to minimize any tendency of this wheel unit to cock. A telescoping universal drive connects a steering wheel on the vehicle with a sprocket chain on the subframe for steering the traction wheel. An internesting compensating linkage system on the subframe provides positive steering movement of the other steerable wheel unit.

9 Claims, 12 Drawing Figures

POWER DRIVEN MATERIAL HANDLING TRUCK

This invention pertains to material handling vehicles and more particularly pertains to vehicles of this type having two support wheel units with fixed axes of rotation and which provide the primary load support and two remote or rear wheel units, with one of the latter being a steerable power-driven traction wheel. By way of further example, this invention is particularly applicable to narrow aisle stand-up rider industrial stacking trucks of the general type described in Gibson U.S. Pat. No. 2,564,002.

Several design requirements should be met in the type of truck to which this invention pertains. These include high lift capacity and high lift height while preserving a high degree of stability. These requirements dictate maximum possible spread of the wheels to maintain stability. However, compact size and a high degree of maneuverability also are requirements for this type of vehicle. Such vehicles or trucks normally must be of a relatively narrow over-all width for operation in narrow aisles of warehouses, factories or the like. The forward wheel units may be on outriggers adapted to extend beneath the load or beneath adjacent materials or structures, or may be behind the load in a counterbalanced vehicle. Use of a short wheel base, with the drive wheel(s) at the end opposite the load supports, enhances maneuverability.

Many trucks for serving the indicated purposes have been of a three-wheeled design, with a single steerable power-driven traction and braking wheel unit at the rear for simplicity and maneuverability. Such a design has shortcomings of lateral stability.

Various four-wheeled designs of such compact trucks have been proposed to obtain greater stability, with a single drive and braking wheel similar to those used in the three-wheeled units, such as in the aforenoted U.S. Pat. No. 2,564,002. Such trucks present an added problem of maintaining the drive wheel in contact with the operating surface at all times so that the machine can be properly controlled. If the single traction wheel is raised off the subjacent surface, as in traversing uneven floors or other operating terrain, all tractive and braking power will be lost.

Many attempts have been made to meet the aforementioned wheel contact requirements in four-wheeled trucks. These include providing a load support unit and a separate articulated power-drive unit, see e.g., Schreck U.S. Pat. No. 2,395,345 and Hubbard et al. U.S. Pat. No. 2,959,235. The aforementioned Gibson U.S. Pat. No. 2,564,002 proposed another solution by way of resilient mounting of a nondriven caster wheel beneath one corner of the vehicle, see also Gibson et al. U.S. Pat. No. 3,392,797 in this regard.

A further desirable feature for four-wheeled stacking trucks is to obtain a steering arrangement which will afford the desired maneuverability while avoiding scuffing. Two wheel units should be positively steered to maintain positive control of direction even under adverse terrain conditions and to avoid side thrust upon reversal of direction as is experienced with caster wheels. (Herein, "terrain" refers to floors as well as to the ground.) Also, the steering mechanism should provide compensated steering, i.e., different turn angles between the two steered wheel units, particularly during turns of short radius. This general steering problem has been recognized in the art, and various solutions have been proposed, see e.g., the elliptical gear cam and drive chain steering mechanism of Brown U.S. Pat. No. 2,913,063, the adjustable intermediate sprocket arrangement of Schreck U.S. Pat. Nos. 2,848,247, 2,982,564 and 3,239,025, the cross linkage arrangement of Hastings, Jr. U.S. Pat. No. 3,057,426 and the steering linkages of Goodacre et al. U.S. Pat. No. 3,392,797.

It is an object of this invention to provide improved material handling vehicles of the aforenoted type.

It is an object of this invention to provide material handling vehicles of the aforenoted type having improved wheel contact and steering characteristics.

It is a further object of this invention to provide such vehicles with a simple and effective arrangement for maintaining a power-driven steerable traction wheel in contact with the subjacent surface when traversing uneven surfaces.

It is a further object of this invention to provide improved vehicles of the aforedescribed type which will also have a high degree of stability, and particularly which will preserve a high degree of lateral stability.

It is another object of this invention to provide an improved steering system for material handling vehicles having two steerable wheel units.

It is a further object of this invention to provide a simple and effective steering linkage for compensatory positive steering of two wheel units in such vehicles.

In carrying out this invention in one illustrative form a power-driven material handling vehicle is provided having four support wheel units, with two of these wheel units being steerable about spaced vertical axes and both mounted on a rigid subframe unit which is adjacent to one end of the vehicle and joined to the main frame of the vehicle for pivoting movement about a longitudinal axis approximately midway between the two steerable wheel units. One of these steerable wheel units comprises a power-driven traction wheel for propelling the vehicle. The other steerable wheel unit comprises a pair of relatively closely spaced wheels mounted for independent tilting movement about a second horizontal axis, the latter axis being disposed below the axis of rotation of this pair of wheels. Steering is effected through a telescoping universal drive shaft driving a sprocket and chain on the subframe unit for steering rotation of the traction wheel unit. An interresting linkage system is connected to the traction wheel unit and to the other steerable wheel unit to provide differential steering of the latter to avoid scuffing or scrubbing of the wheels during turning movements.

For a more complete understanding of this invention reference should now be had to the embodiment illustrated in greater detail in the accompanying drawings and described below by way of an example of the invention. In the drawings.

Figure 2:
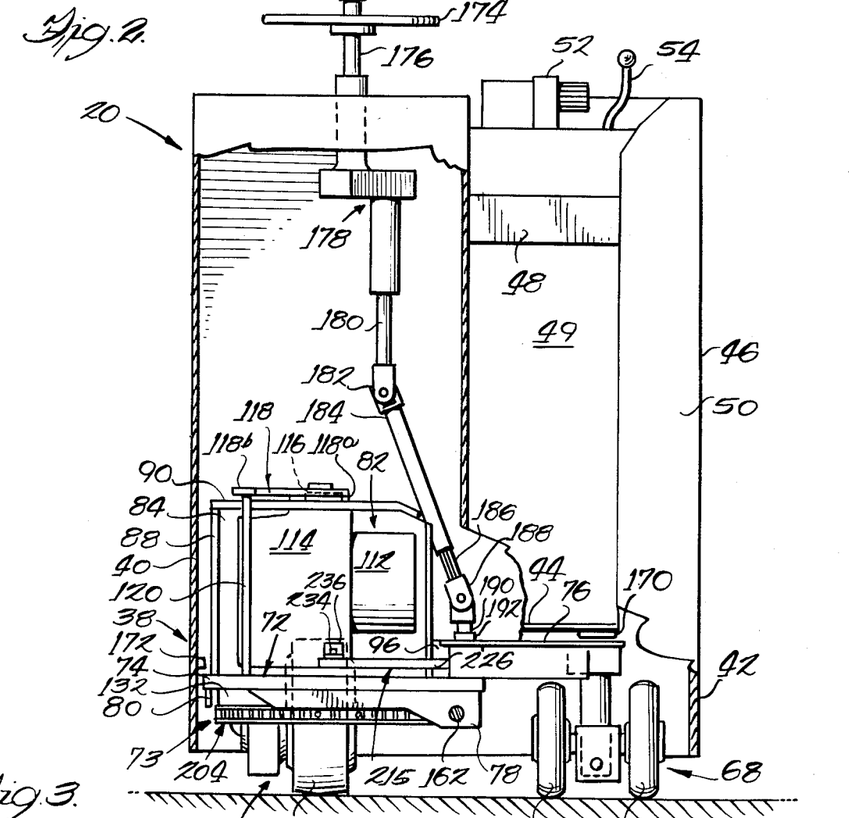
FIG. 2 is a rear elevation, partially in section, of the truck of FIG. 1.
Figure 3:
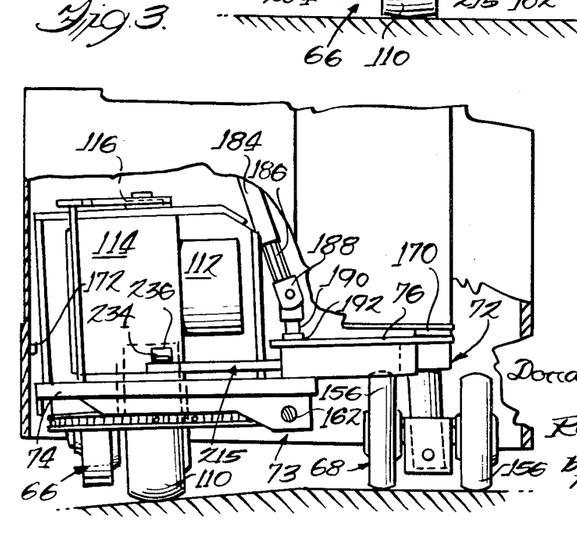
FIG. 3 is a partial view, similar to FIG. 2, illustrating a position of the rear support units in traversing uneven terrain.

Referring to the drawings, the truck 20 comprises an industrial stacking truck of the type often known as a stand-up rider stacking truck or as a narrow aisle stacker. The truck 20 includes a main body and frame unit indicated generally at 22. This frame unit includes a pair of forwardly extending support outriggers 24 and 26, posts 28 and 30 for supporting a tiltable mast unit 32, a battery compartment at 34 for receiving an electric storage battery 36, and a carrier frame housing 38. As seen in FIGS. 2 and 3, the carrier frame housing 38 includes a section 40 of substantial vertical height at one side of the rear portion of the machine and a lower section 42 at the opposite side. Electrical wiring and switching components, drive motors, hydraulic pumps and hydraulic control components (not shown), may be housed within the housing section 40 and may be of designs known to those skilled in the art.

Figures 1, 12:
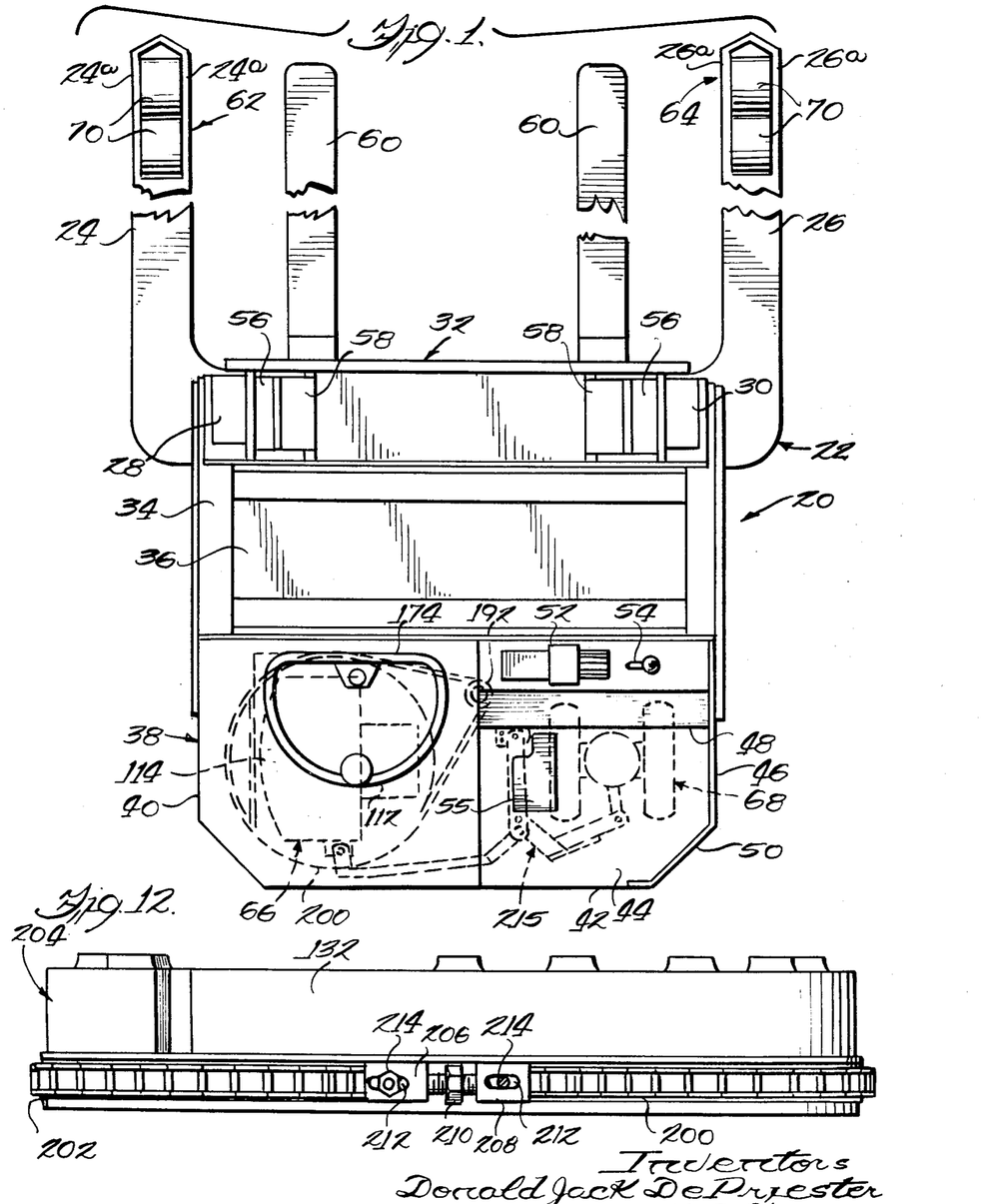
FIG. 1 is a plan view of a narrow aisle rider type industrial stacking truck employing teachings of this invention.
FIG. 12 (Sheet 1) is a side view of the lower bearing and steering ring on the traction wheel unit of the machine of FIG. 1.

In normal operation of the machine 20, the operator stands on platform 44 atop section 42 and beside section 40. A side panel 46, forward panels 48 and 49 and a rear corner panel 50 further define the operator's work station. A control unit 52 is provided at the upper end of panel 48 for controlling the electrical traction motor and the lifting hoist. A lever 54 controls the tilting of the mast 32. A "dead-man" brake control foot pedal 55 is provided on platform 44 (FIG. 1).

The mast unit 32 may be of a known type, including a mast section 56 pivotally mounted on posts 28 and 30, with a telescoping interlocking mast section 58 and a lifting fork unit having a pair of lifting tines 60 mounted for vertical movement along the section 58. A hydraulic piston and chain system (not shown) controls the raising and lowering of the section 58 and the fork unit in a known manner.

The truck 20 has a four-point support system comprising a pair of wheel units 62 and 64 in the outer end portions of the outriggers 24 and 26 respectively, a steerable drive unit 66 including a traction wheel 110 mounted beneath compartment 40, and another steerable wheel unit 68 beneath section 42. Each of the wheel units 62 and 64 consists of a pair of rollers 70 disposed in fore-and-aft alignment with one another between parallel side support bars 24a and 26a. The axis of rotation of each load roller or wheel 70 is fixed relative to the respective outrigger, and the two wheels of unit 62 are axially aligned with the wheels of unit 64. The outriggers 24 and 26 are of shallow depth and extend forwardly at the lower portion of the machine. The rollers or wheels 70 are of relatively small diameter so as not to extend above the outriggers 24 and 26 to permit ready insertion of the outriggers beneath a load to be raised on tines 60, such as into or beneath a pallet, or beneath shelving, adjacent pallets, or other low clearance objects.

Referring particularly to FIGS. 2, 4, 6 and 7, the wheel units 66 and 68 are steerably mounted on a common rigid subframe unit 72. The units 66, 68 and 72 comprise a subframe support assembly 73. The subframe unit 72 is attached to the main frame 22 for limited free articulating or tilting movement relative to the main frame 22 about a generally horizontal axis extending longitudinally of the machine 20, approximately midway between the wheel units 66 and 68 and between the wheel units 62 and 64.

Figure 7:
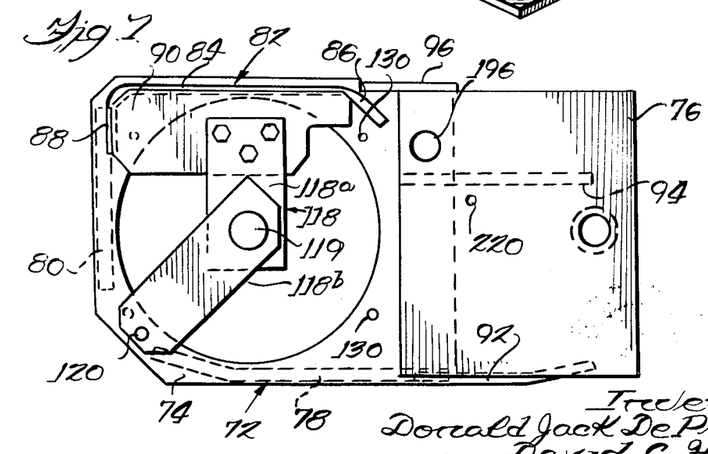
FIG. 7 is a plan of the subframe unit of FIG. 6.

The subframe unit 72 is a rigid weldment comprising two base plates 74 and 76 secured with two edges in spaced overlapping relation, see FIGS. 2 and 7. Downwardly extending reinforcing strips 78 and 80 are welded along the lower rear and outer end edges of plate 74. An upstanding drive support 82 is welded to the upper front portion of plate 74. Support 82 includes a center plate section 84, a rearwardly curved end section 86, and an opposite end section 88 extending along the outer end of plate 74. A top plate 90 is disposed generally parallel to the plate 74 at the upper edge of support 82. The second plate section 76 is disposed slightly above and parallel to plate 74, with one edge of plate 76 overlapping a subjacent edge of plate 74, as noted above. A pair of reinforcing strips 92 and 94 are welded to the underside of plate 76 and to the underlapping portion of plate 74. A forward bearing plate 96 also is welded to the forward edges of plates 74 and 76, in the area of overlap, and is provided with a bearing opening 98 axially aligned with a corresponding opening 100 in reinforcing strip 78. A downwardly extending spindle 102 is welded in an opening 104 in plate 76 and is provided with a lower spindle end for journaling the steerable wheel unit 68.

Figure 4:
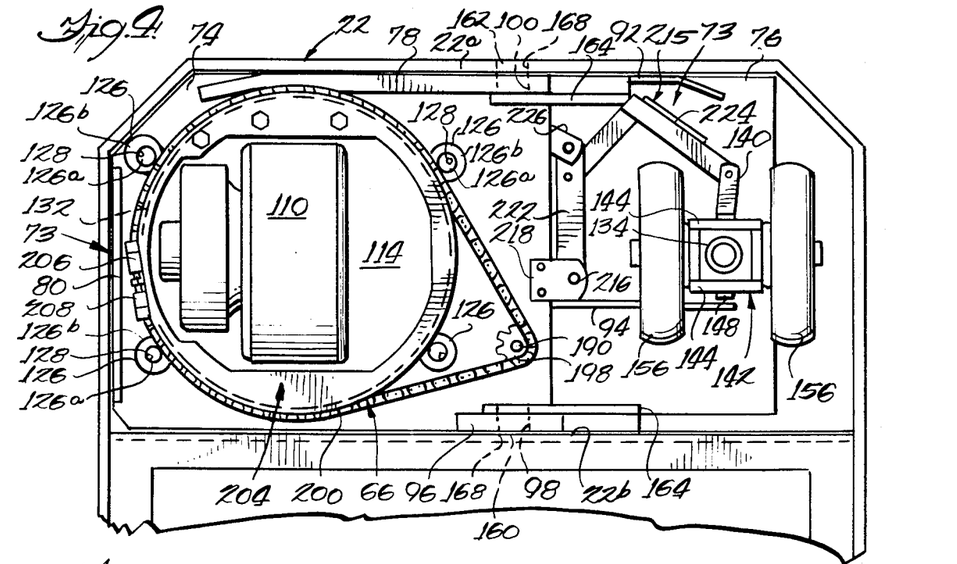
FIG. 4 is an enlarged bottom plan of the rear section of the illustrated truck.
Figure 6:
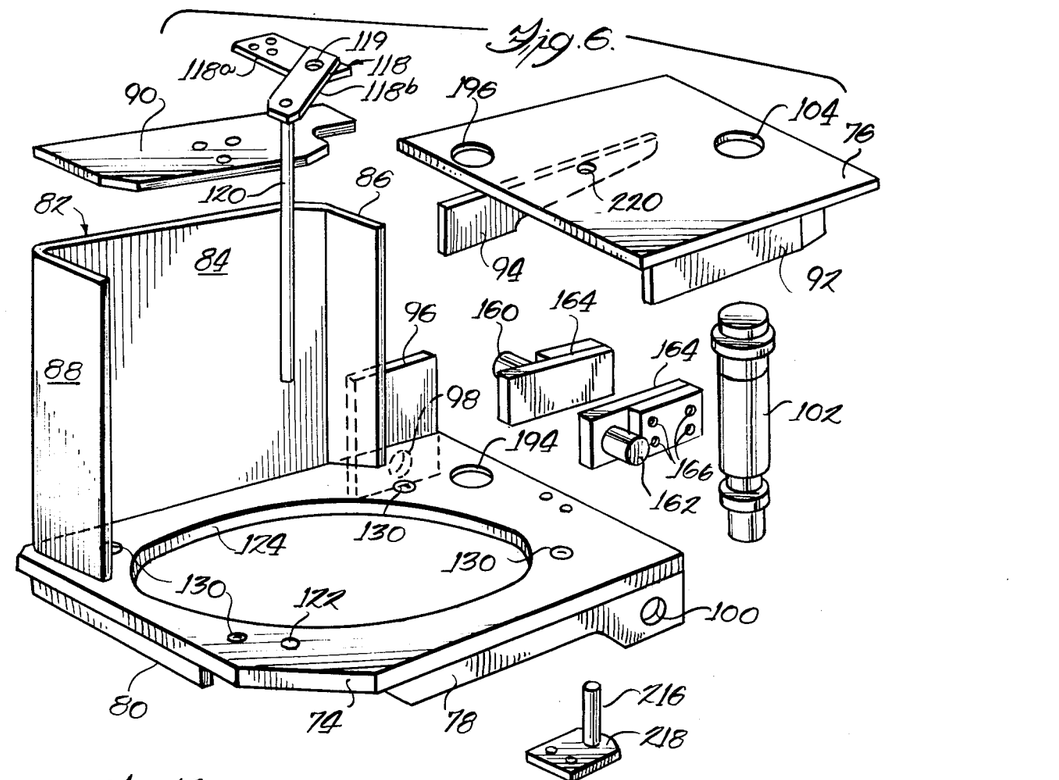
FIG. 6 is a perspective view of the subframe unit and mounting pins of the machine of FIG. 1, with various components disassembled.

The drive wheel unit 66 is mounted in the subframe 72. As seen in FIGS. 2 and 3, the drive unit 66 includes a traction wheel 110, a reversible electric drive motor 112, a suitable transmission, within a housing 114, by which the motor 112 is in continual drive engagement with the wheel 110, and appropriate braking means of a known construction. The traction-drive unit 66 is provided with a thrust bearing 116 at its upper end. Referring also to FIGS. 4, 6 and 7, the bearing 116 is journaled in a transverse support bracket 118 comprising a plate 118a which is bolted to the upper surface of plate 90 at one end, a second plate 118b welded to the inner end of plate 118a around the bearing opening 119, and a post 120 extending from the distal end of plate 118b to a mounting opening 122 in plate 74. The lower portion of the drive unit 66 extends through a circular opening 124 in plate 74. As best seen in FIG. 4, four lateral thrust bearings 126 are mounted on bolts 128 projecting upwardly into threaded openings 130 (FIGS. 6 and 7) in the plate 74. The bearings 126 engage a circular cylindrical bearing surface 132 of a ring 204 on the unit 66. Each bearing 126 may include an inner sleeve 126a eccentrically mounted on the respective bolt 128, with an outer race 126b in contact with the surface 132, whereby the bearings may be adjusted laterally by rotation of the inner sleeves. Thus, the bearing 116 transmits vertical thrust load between the traction-drive unit 66 and the subframe 72, while the bearing 116 together with the bearings 126 transmit lateral thrust loads for driving and braking of the truck 20.

The drive unit 66 is rotatable about a vertical steering axis passing through the center of bearing 116 and the center of the circle tangent to the bearings 126. The traction wheel 110 is so positioned on the unit 66 that the noted vertical steering axis intersects the area of contact of the wheel 110 with the subjacent terrain to minimize torque loads on the steering system and thus to minimize the forces required for steering.

Figure 5:
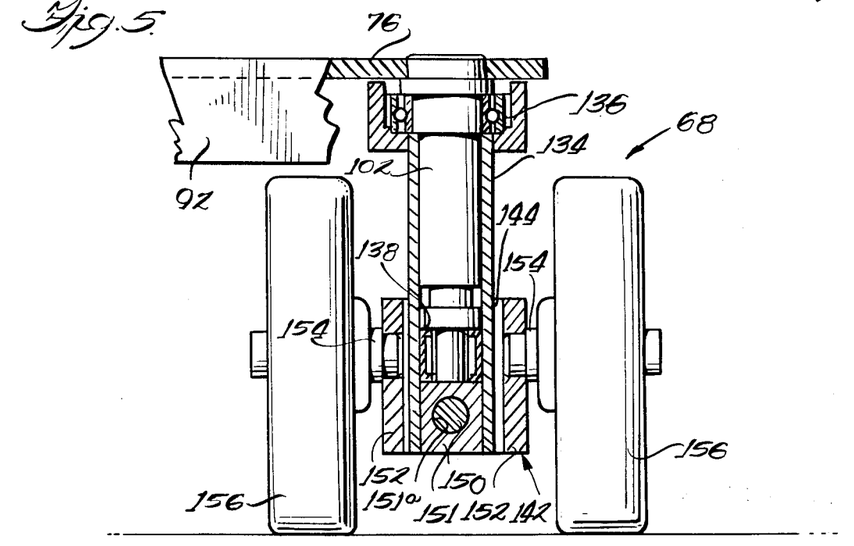
FIG. 5 is an enlarged elevation, partially in section, of the steerable nondriven support wheels.

Referring now particularly to FIGS. 4 and 5 a pivot tube 134 encompasses and is journaled on the spindle 102. Appropriate axial and lateral thrust bearings are provided at 136 and 138 for transmitting forces between the wheel assembly and the subframe unit while permitting free rotational steering movement of the wheel unit 68 on the spindle 102. A tiller arm 140 projects radially rearward from the tube assembly 134 for steering control, as will be referred to further below.

A wheel axle assembly 142 includes a pair of plates 144 spaced apart to straddle the lower portion of the tube 134. Aligned openings 146 (FIG. 9) in plates 144 are provided with bushings 148 to journal a pin 150. The pin 150 extends through the bushings 148 and through a transverse opening 151a in a bearing block 151 fixed in the lower end of the tube 134. A pair of side plates 152 are welded to the plates 144. Plates 152 are spaced from one another to accommodate the tube 134 therebetween with clearance (see FIG. 5) to permit articulation of assembly 142 about the center axis of pin 150, e.g., through an angle of about 4°. Axially aligned stub axles 154 are mounted in the two plates 152 for rotatably journaling two wheels 156. It will be noted that the wheel unit 68 thus is rotatable about a vertical steering axis midway between the two wheels 156 and intersecting the axis of rotation of these wheels. Further, the pin 150 is disposed well beneath the axis of rotation of the wheels 156, closely adjacent the plane of contact between these wheels and the subjacent terrain. This minimizes the torque load on the wheel assembly 68 from side thrust during turning movements, or other side loads on the machine 20, and assists in avoiding cocking of the wheels 156. Keeping the pivot axis corresponding to the center line of pin 150 close to the lower surface of the wheels also assists in providing simple beam type movement of the rigidly joined wheels 156 as they pivot about this axis to adjust to uneven terrain, thereby minimizing lateral translational movement of the terrain contacting surfaces and attendant scuffing or scrubbing problems and related torque loads on the wheel support assembly.

Referring to FIGS. 4, 6 and 7, the subframe unit 72 is pivotally mounted on the main frame and housing 22 by a pair of axially aligned support pins 160 and 162 which engage the openings 98 and 100, respectively. The pins 160 and 162 are horizontally disposed on a common axis located approximately midway between the wheel units 66 and 68. Each of the pins 160 and 162 is secured to a weldment 164 which is attached to the main frame, as by bolts extending through the frame 22 and engaging threaded openings 166. Each of the pins 160 and 162 passes through the respective opening 98 or 100 and also through an aligned opening 168 in a contiguous element (22a, 22b) of the main frame (FIG. 4).

It will be appreciated that the two steerable wheel units 66 and 68, and the respective wheels, are rigidly mounted on subframe 72 insofar as relative vertical movement therebetween is concerned, apart from the slight relative movement occasioned by pivoting movement of the wheels 156 about the axis of pin 150 to insure contact of both of these wheels with the subjacent surface. However, the two wheel units 66 and 68 are freely adjustable vertically relative to one another and relative to the main frame and housing 22 and to the other wheel units 62 and 64 by pivotal movement of the entire subframe assembly 73 about the horizontal longitudinal axis defined by the pivot pins 160 and 162.

Stop elements may be provided on the main frame and housing, as at 170 and 172 (FIGS. 2 and 3), to limit the degree of relative pivotal movement permitted between the assembly 73 and the main frame 22. Such stops will insure shifting of the effective truck support point from the pivot axis of pins 160 and 162 to the respective outer rear wheel contact surface to prevent tipping of the truck when the relative tipping movement between the frame units tends to exceed the predetermined limit set by the stops, e.g., 3½°. Also, spring elements and/or shock absorber components may be interposed between the respective free ends of the subframe unit 72 and the main frame to retard pivotal or rocking movements between the frame components, while maintaining the essentially free pivotal movement which will insure maintenance of adequate traction contact of the traction wheel 110 with the subjacent terrain at all times except under extremely adverse tipping of the truck toward the side of the support wheel unit 68.

Positive conjoint steering of the wheel units 66 and 68 is obtained through a steering system including a steering wheel 174 mounted atop housing section 40 adjacent the operator station on platform 44. Referring to FIG. 2, the steering wheel shaft 176 drives a steering transmission 178 interposed in the steering system. The transmission 178, for instance, may comprise mating spur gears or a double sprocket and connecting roller chain, in accordance with the steering movement of the wheel units desired upon a predetermined direction of rotation of the steering wheel 174. The output shaft 180 from transmission 178 drives a telescoping universal drive shaft assembly including a first universal knuckle 182 attached to an internally splined shaft 184, a mating externally splined shaft 186, and a second universal knuckle 188. Knuckle 188 drives a shaft 190. Referring to FIGS. 1, 4 and 6, shaft 190 is journaled in a sleeve 192 supported in aligned openings 194 and 196 in the overlapping portions of plates 74 and 76. A sprocket 198 (FIG. 4) is mounted on the lower end of shaft 190. The sprocket 198 engages a roller chain 200 which engages the drive unit 66.

The chain 200 passes along an annular channel 202 of a ring 204 (FIGS. 4 and 12) circumscribing unit 66 and secured to the housing 114. Anchor elements 206 and 208 are joined to the opposite ends of the chain 200 and are provided with internal threads of opposite pitch for engagement by a turnbuckle element 210 for tightening adjustment of the chain. Each element 206 and 208 also is provided with an elongated opening 212 receiving a stud 214 which is threadably engaged with the ring 204 to lock the elements 206 and 208 in their adjusted positions. Rotation of the steering wheel 174 will cause steering rotation of the drive unit 66, including the wheel 110, about the vertical axis of rotation of this unit. This rotation will either be in the same direction as the rotation of the steering wheel or in the opposite direction depending upon the mechanism utilized in the steering transmission assembly 178.

Figures 8, 9:
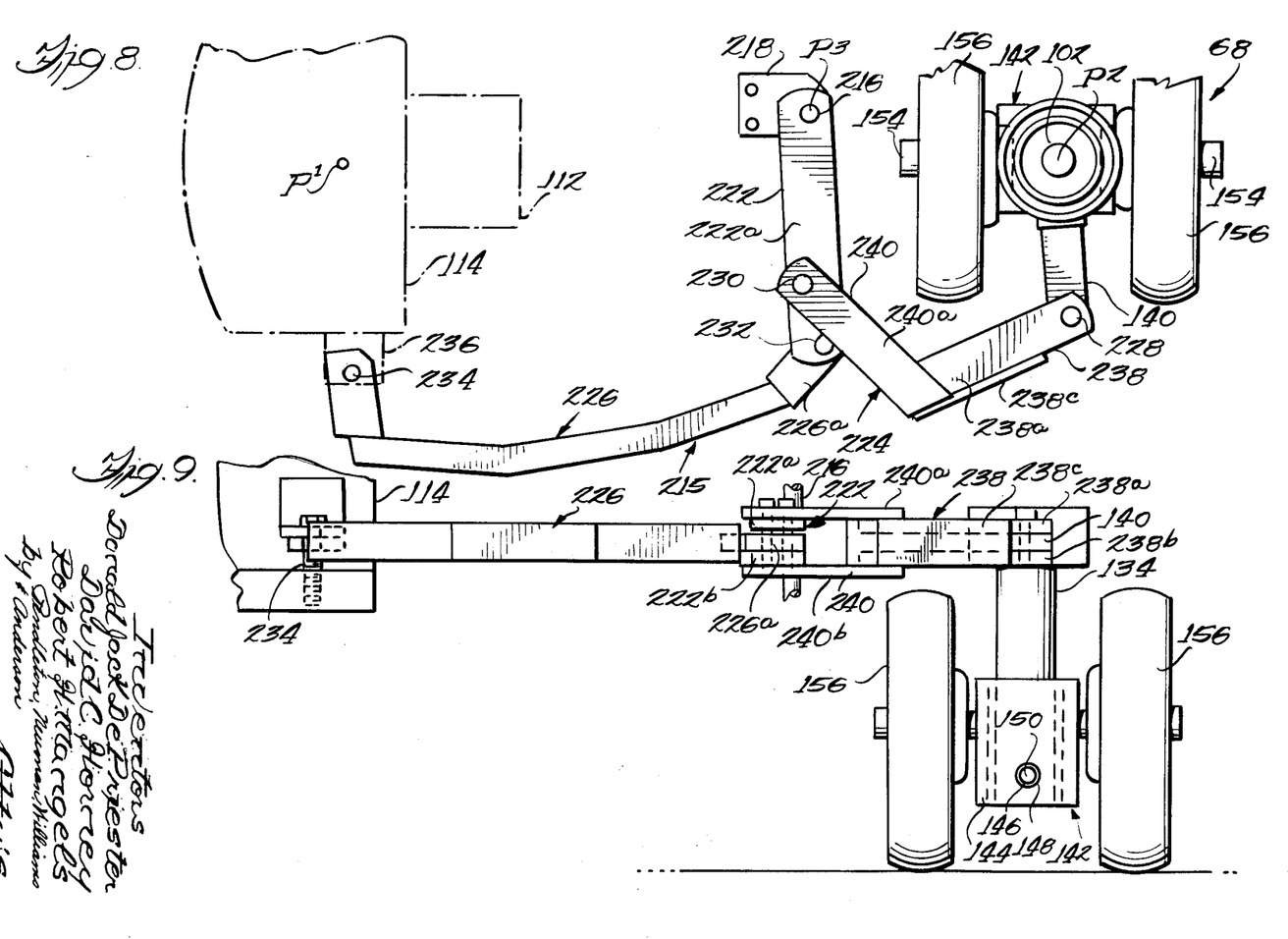
FIG. 8 is an enlarged plan of the steering linkage of the truck of FIG. 1, drawn to scale.
FIG. 9 is an elevation of the linkage of FIG. 8.

Positive steering of the wheel unit 68 is effected in response to steering movement of the unit 66 through the linkage assembly 215 illustrated in detail in FIGS. 8 and 9. This linkage has three pivot axes fixed relative to the subframe 72 and five movable links. The three pivot axes consist of the vertical steering axis of the steerable wheel unit 66 (identified as $P^1$ in FIGS. 8, 10 and 11), the center axis $P^2$ of spindle 102 about which unit 68 steers, and the axis $P^3$ of a vertical pin 216. As seen in FIGS. 4 and 6, pin 216 is attached to a plate 218 secured to the underside of plate 74 and engages an opening 220 in plate 76. The five links consist of the housing 114, tiller arm 140, an idler arm 222, an angular drag link 224 and a C-shaped drag link 226. The idler arm 222 is pivotally mounted on pin 216. Drag link 224 is joined to a pivot pin 228 at the distal end of tiller arm 140 and to a pivot pin 230 mounted on idler 222 at a point spaced inwardly from the distal end of the idler. Drag link 226 is pivotally jointed to a pin 232 at the distal end of idler arm 222 and to a pivot pin 234 in a bracket 236 on the periphery of the housing 114.

As best seen in FIGS. 2, 3 and 4, the steering linkage 215 is disposed above plate 74 and below the plate 76 but above the wheels 156. Also, the pin 216 is disposed rearwardly of the sprocket shaft 190 (relative to a forward direction defined as the direction of extension of the outriggers 24 and 26), with the idler arm 222 extending rearwardly from the pin 216. Thus, the linkage system is mounted on and moves with the subframe 72 and is disposed to be clear from other components of the subframe assembly for free steering movement. The angular configuration of links 224 and 226 allows for movement of the pivot pin 228 beyond the pivot tube 134 and for movement of the pivot pin 234 to the far side of the drive unit 66 in order to obtain the desired degree of steering movement of the respective steerable wheel units.

As will be appreciated by those skilled in this art, the truck 20 ideally should be capable of pivot turns of any degree between a straight ahead, parallel movement mode to a turning movement wherein the turn center is approximately midway between the load wheels 62 and 64. To prevent scuffing or scrubbing of the wheels during such turns, the steering geometry should provide different turn angles of the two steerable wheel units. The desired results can be visualized upon recognizing the fact that the axes of rotation of all support wheels of the vehicle preferably should pass through the turn center, and that with wheels 70 having fixed axes, the line on which the various centers of turn should be located is a line transverse to the machine 20 and passing through a center axis of the wheel units 62 and 64. The turn center may be at any point on this line between an infinite distance to the right (in straight ahead movement), to a maximum angle of turn when the turn center is midway between the wheel units 62 and 64, to an infinite distance to the left (again in the straight ahead movement situation). The specific turn angles of the individual wheel units for turns of varying degrees can be determined mathematically or graphically. In outline, when the truck is steered during straight ahead or near straight ahead or rearward movement, the support wheel unit 68 should be rotatable about its steering axis on approximately a 1:1 ratio relative to drive unit 66. However, this steering or rotation ratio must vary as the minimum turn radius is approached.

By way of a further example, assuming a vehicle with a wheel base of 57" between the transverse center axis of the wheel units 62-64 and the transverse axis through wheels 110 and 156, and with the steering axis of each wheel unit 66 and 68 offset 9" from the longitudinal center line of the vehicle, one of the steerable wheel units would have to be turned through an angle of about 99° while the other steerable unit would have to be turned through an angle of about 81° from their straight ahead positions, in the same direction, to effect turning movement about a turn center midway between the load support wheels 62 and 64.

Figures 10, 11:
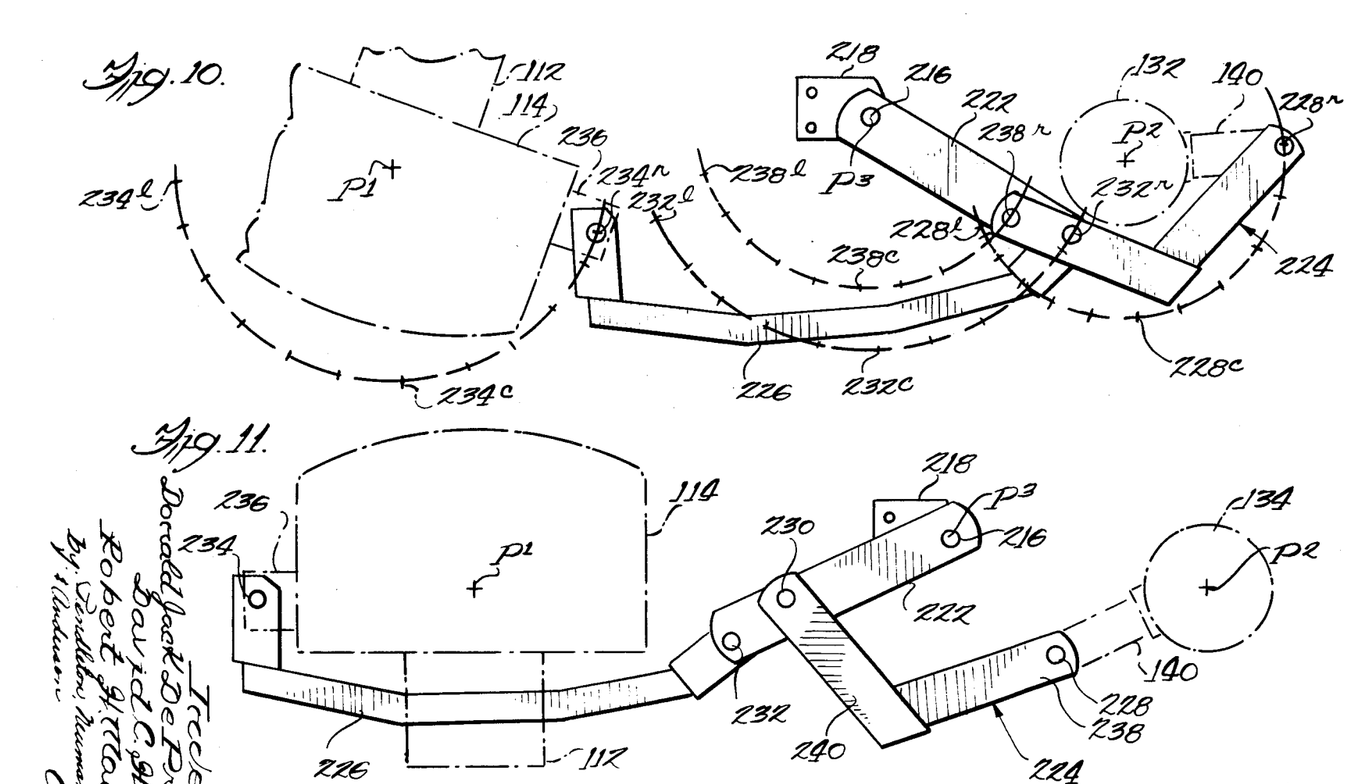
FIG. 10 is a partially schematic layout of the steering linkage, drawn to scale, indicating various steering positions of the linkage.
FIG. 11 is another view similar to FIG. 10 showing the linkage in another position.

The linkage system 215, which is shown to scale in FIGS. 8, 10 and 11 in various positions, approximates the ideal solution to this steering problem. The illustrated embodiment permits turning wheel unit 66 up to about 90° clockwise (as viewed from above), with corresponding but lesser clockwise movement of unit 68 up to about 72° and turning wheel unit 66 up to about 72° counterclockwise, with corresponding but greater counterclockwise movement of wheel unit 68 up to about 90°, thus permitting turns about turn centers directly forward of either of these wheel units or any turn centers outwardly of these points. These extreme steering positions of the linkage 215 are illustrated in FIGS. 10 and 11. The various positions and arcs of movement of the movable pivot pins also are indicated schematically in FIG. 10 wherein the subscript "*l*" indicates the clockwise positions and "*r*" indicates the counterclockwise positions. The subscript "*c*" indicates the center or straight ahead positions; see also FIG. 8.

Several features of the disclosed linkage may be noted. The steering axes of the two wheel units 66 and 68 are disposed in a common plane extending normal to the longitudinal center line of the machine 20. The pivot pin 216 is positioned slightly forward of this plane. Idler link 222 extends rearwardly across this plane to the pivot points joining drag links 224 and 226. These pivot points are only slightly rearward of the aforementioned transverse plane, and no portion of the linkage extends rearward substantially beyond the rearmost portion of the periphery of the wheels 110 and 156. The pivot pin 216 also is offset toward the wheel unit 68 from the longitudinal center line of the machine 20, and the drag link 224 for the adjacent wheel unit 68 is joined to the idler arm 222 between the pivot pin 216 and the pin 232 joining the draw link 226 for the remote wheel unit 66. Tiller arm 140 is offset slightly outward when the wheel units are in the zero turn, or straight ahead position, see FIGS. 8 and 10. The links 224 and 226 are of bell-crank or shallow C-shaped configuration as noted and illustrated to accommodate folding about the drive unit housing 114 and the sleeve 134 for providing the indicated angles of turn of the wheel units and to provide a geometry which avoids going over center at its maximum end positions, i.e., near the "*l*" and "*r*" positions of FIG. 10.

Further, the individual links are of interrelated designs to permit nesting between the links as relative movement takes place. To this end, and referring particularly to FIG. 9, idler arm 222 is formed of a pair of spaced bars 222a and 222b, with drag link 226 having an end portion 226a of a thickness to pass between the bars 222a and 222b. The pin 232 joining links 222 and 226 is of a length no greater than the total thickness of link 222. Drag link 224 comprises two arms 238 and 240. Arm 238 comprises upper and lower bars 238a and 238b spaced to span the tiller arm 140, together with a reinforcing strip 238c secured over the rear edges thereof. Arm 240 comprises bars 240a and 240b spaced a sufficient distance to span the outer surfaces of link 222 and of arm 238. Thus, the links of the steering linkage interdigitate during articulation (note FIGS. 8 and 10) to obtain a full range of steering movement with a linkage system of very compact design.

It will be obvious that certain modifications may be made of the specific embodiment shown in the drawings and described above without departing from the spirit and scope of this invention. In one example, steering may be effected by direct application of steering force to some part of the linkage 215, such as to idler 222. Also, this invention may be embodied in counterbalanced industrial trucks, wherein the primary support wheels are behind the load, as well as in the outrigger type illustrated and specifically described herein.

It will be seen that improvements have been provided in material handling vehicles which meet the objects of this invention.

While a particular embodiment of this invention is shown and described herein, it will be understood, of course, that the invention is not to be limited thereto since many modifications may be made by those skilled in the art, particularly in light of the foregoing teachings. It is contemplated, therefore, by the appended claims to cover any such modifications as fall within the true spirit and scope of this invention.

What is claimed is:

1. A power-driven material handling vehicle including a main body frame and having a plurality of support wheel units including at least one power-driven steerable traction wheel for propelling said vehicle, a rigid frame unit pivotally joined to said main body frame for pivotal movement relative thereto about a generally horizontal axis, said power-driven steerable traction wheel being mounted on said frame unit at one side of said pivot axis for steering rotation relative to said frame unit about a generally vertical steering axis on said one side of said pivot axis, and another of said support wheel units being mounted on said frame unit on the opposite side of said pivot axis, whereby said last-mentioned wheel unit and said traction wheel may adjust vertically to maintain traction and support contact with uneven terrain by pivoting of said frame unit relative to said main body frame, said other support wheel unit including pivotally mounted dual wheels, said dual wheels being mounted for rotation about a common axis and being pivotable about an axis disposed below and transverse to said common axis of rotation, and means for steering said power-driven wheel.

2. A vehicle as in claim 1 including a mounting post projecting downward from said frame unit, said other support wheel unit being supported on said post.

3. A vehicle as in claim 2 wherein said other support wheel unit is spaced from the superjacent portion of said frame unit.

4. A vehicle as in claim 1 including a pair of laterally spaced outriggers on said main body frame, and non-steerable support wheels on the outer end portions of said outriggers.

5. A power-driven material handling vehicle including a main body frame and having a plurality of support wheel units including at least one power-driven steerable traction wheel for propelling said vehicle, a rigid frame unit pivotally joined to said main body frame for pivotal movement relative thereto about a generally horizontal axis, said power-driven steerable traction wheel being mounted on said frame unit at one side of said pivot axis for steering rotation relative to said frame unit about a generally vertical steering axis on said one side of said pivot axis, and another of said support wheel units being mounted on said frame unit on the opposite side of said pivot axis, whereby said last-mentioned wheel unit and said traction wheel may adjust vertically to maintain traction and support contact with uneven terrain by pivoting of said frame unit relative to said main body frame, said frame unit including a downwardly projecting mounting post, said other support wheel unit comprising a pair of wheels disposed one on each side of said post, said pair of wheels having a common axis of rotation and being mounted on said post for pivotal adjustment about an axis disposed below and transverse to said common axis of rotation, and means for steering said power-driven wheel.

6. A power-driven material handling vehicle including a main body frame and having a plurality of support wheel units including a power-driven steerable traction wheel unit for propelling said vehicle, a rigid frame unit pivotally joined to said main body frame for pivotal movement relative thereto about a generally horizontal axis, said frame unit comprising first and second vertically spaced generally horizontal frame components with said second component above said first component, said power-driven steerable traction wheel unit being mounted on said first component of said frame unit at one side of said pivot axis for steering rotation relative to said frame unit about a generally vertical steering axis on said one side of said pivot axis, said first component extending about said power driven steerable traction wheel unit and having support bearing engagement therewith, and another of said support wheel units being mounted on said second component of said frame unit on the opposite side of said pivot axis, said second component extending over said other of said support wheel units, said last-mentioned wheel unit and said traction wheel unit thereby being adjustable vertically to maintain traction and support contact with uneven terrain by pivoting of said frame unit relative to said main body frame, and means vertically positioned between said first and second components and connected to said power-driven steerable traction wheel unit and to said other of said support wheel units for providing positive steering control of said other support wheel unit in response to steering movement of said traction wheel unit.

7. A vehicle as in claim 6 wherein said steering control means comprises a linkage system connected to said traction wheel unit and to said other support wheel unit.

8. A vehicle as in claim 7 wherein said linkage system includes links movable into internesting relationship with one another during steering articulation.

9. A vehicle as in claim 6 including means on said frame unit for steering rotation of said power-driven wheel, steering operating means on said main body frame, and universal telescoping drive means joining said steering operating means and said means on said frame unit.

* * * * *